United States Patent
Ibn Seddik (10) Patent No.: US 10,281,929 B2
(45) Date of Patent: May 7, 2019

(54) METHOD AND AUTONOMOUS UNDERWATER VEHICLE ABLE TO MAINTAIN A PLANNED ARRANGEMENT

(71) Applicant: CGG SERVICES SA, Massy (FR)

(72) Inventor: Mohamed Saad Ibn Seddik, Brest (FR)

(73) Assignee: CGG SERVICES SAS, Massy (FR)

( * ) Notice: Subject to any disclaimer, the term of this patent is extended or adjusted under 35 U.S.C. 154(b) by 135 days.

(21) Appl. No.: 15/117,858

(22) PCT Filed: Feb. 5, 2015

(86) PCT No.: PCT/IB2015/000340
§ 371 (c)(1),
(2) Date: Aug. 10, 2016

(87) PCT Pub. No.: WO2015/125014
PCT Pub. Date: Aug. 27, 2015

(65) Prior Publication Data
US 2016/0355247 A1 Dec. 8, 2016

Related U.S. Application Data

(60) Provisional application No. 61/941,519, filed on Feb. 19, 2014.

(51) Int. Cl.
*G05D 1/10* (2006.01)
*B63G 8/14* (2006.01)
(Continued)

(52) U.S. Cl.
CPC .............. *G05D 1/10* (2013.01); *B63G 8/14* (2013.01); *B63G 8/16* (2013.01); *G01V 1/3817* (2013.01); *B63G 2008/004* (2013.01)

(58) Field of Classification Search
CPC ...... B63G 2008/004; B63G 8/14; B63G 8/16; G05D 1/10; G05D 1/0875;
(Continued)

(56) References Cited

U.S. PATENT DOCUMENTS

| 5,894,450 A * | 4/1999 | Schmidt | H04B 13/02 367/131 |
| 6,932,185 B2 | 8/2005 | Bary et al. | |

(Continued)

FOREIGN PATENT DOCUMENTS

| CN | 103558622 A | 2/2014 |
| EP | 1217390 A1 | 6/2002 |
| WO | 2013/045588 A1 | 4/2013 |

OTHER PUBLICATIONS

Singh et al., "An Integrated Approach to Multiple AUV Communications, Navigation and Docking," 1996, OCEANS '96. MTS/IEEE. Prospects for the 21st Century. Conference Proceedings, pp. 59-64 (Year: 1996).*

(Continued)

*Primary Examiner* — Spencer D Patton
(74) *Attorney, Agent, or Firm* — Patent Portfolio Builders PLLC (57) ABSTRACT

Methods and devices are configured to maintain a planned arrangement of autonomous underwater vehicles (AUVs). An AUV performs a corrective motion to adjust its current position relative to other AUVs emitting signals, so that the AUV's corrected position matches a planned position of the AUV in the planned arrangement better than its current position. The corrective motion is determined based on the location of the AUVs whose emitted signals are detected by the AUV.

17 Claims, 5 Drawing Sheets

(51) Int. Cl.
*G01V 1/38* (2006.01)
*B63G 8/16* (2006.01)
*B63G 8/00* (2006.01)

(58) Field of Classification Search
CPC . G01V 1/3817–1/3835; B62B 2702/00; B62B 2702/10; B62B 2702/12; B62B 2702/14; G01S 1/80–1/807; G01S 1/76; G01S 3/802; G01S 3/8083; G01S 3/8086; G01S 11/14
See application file for complete search history.

(56) References Cited

U.S. PATENT DOCUMENTS

| | | | |
|---|---|---|---|
| 8,509,030 B2 | 8/2013 | Napolitano et al. | |
| 2002/0110048 A1 | 8/2002 | Vandenbroucke | |
| 2011/0297070 A1* | 12/2011 | Riggs | B63G 8/16 114/330 |
| 2013/0322206 A1 | 12/2013 | Brizard | |
| 2013/0329519 A1 | 12/2013 | Brizard et al. | |
| 2014/0056100 A1 | 2/2014 | Brizard | |

OTHER PUBLICATIONS

Deffenbaugh et al., "The Relationship between Spherical and Hyperbolic Positioning," 1996, OCEANS '96. MTS/IEEE. Prospects for the 21st Century. Conference Proceedings, pp. 590-595 (Year: 1996).*

International Search Report in related International Application No. PCT/IB2015/000340, dated Aug. 20, 2015.

Written Opinion of the International Searching Authority in related International Application No. PCT/IB2015/000340, dated Aug. 20, 2015.

European Office Action, dated Sep. 28, 2018, for related European Application No. 15721311.7. (All references not cited herewith have been previously made of record.).

* cited by examiner

METHOD AND AUTONOMOUS UNDERWATER VEHICLE ABLE TO MAINTAIN A PLANNED ARRANGEMENT

CROSS REFERENCE TO RELATED APPLICATIONS

This application claims priority and benefit from U.S. Provisional Patent Application No. 61/941,519, filed Feb. 19, 2014, for "System and method to organize multi-robots in formation," the contents of which is incorporated in its entirety herein by reference.

BACKGROUND

Technical Field

Embodiments of the subject matter disclosed herein generally relate to methods and devices that maintain a planned arrangement of autonomous underwater vehicles (AUVs) without using a fixed reference.

Discussion of the Background

Marine geophysical imaging is in high demand because it is useful in locating resources, such as oil and gas reservoirs, under the seafloor. The images are obtained from data collected during surveys, with the data carrying information about waves that traveled through an explored formation. By measuring time and amplitude of waves detected by receivers, it is possible to evaluate depths of features (e.g., interfaces between layers in which the waves propagate with different velocities) causing wave reflections.

Seismic waves are frequently used in marine surveys. In a traditional data acquisition system, seismic receivers are provided on towed streamers. This traditional configuration is expensive because of the high costs associated with operating the towing vessel(s) and the streamers. Additionally, the receivers are affected by noise due to the streamers' movement in water, thereby degrading data quality. Moreover, frequency notch (occurring due to interference of up-going waves with down-going waves) diversity may be limited when the data is recorded by traditional data acquisition systems.

To overcome some problems of traditional data acquisition systems, new survey technologies deploy seismic receivers on the bottom of the ocean (ocean bottom sensors, or OBS) to achieve a coupling with the ocean bottom and to reduce noise. However, positioning seismic sensors remains a challenge for OBS technology.

Some other survey technologies use stations and receivers permanently or semi-permanently set on the seafloor (as disclosed in U.S. Pat. No. 6,932,185, and European Patent No. EP 1 217 390, the entire contents of which are incorporated herein by reference). This approach overcomes some of the traditional configuration's problems, but it is still expensive and not flexible because stations and receivers are difficult to relocate or reuse. Additionally, positioning the stations is not straightforward, and notch diversity is not greatly improved.

Most of the currently used data acquisition systems are either (i) towed close to the surface, with streamers, or (ii) at the seabed with OBS. Both situations have substantial drawbacks, such as not offering the desirable notch diversity.

Recently, a different approach has been considered: using receivers mounted on AUVs deployed deeper than the streamers, but not at fixed positions on the seafloor (see, e.g., U.S. Pat. Nos. 5,894,450 and 8,509,030, U.S. Patent Application Publication Nos. 2013/0322206, 2013/0329519 and 2014/0056100, the entire contents of which are incorporated herein by reference). The use of AUVs substantially decreases data acquisition cost and solves the problem of notch diversity. However, one difficulty with this approach is controlling the receivers' positions in the presence of underwater currents.

Note that electromagnetic waves are strongly attenuated in water so the AUVs cannot use GPS or other locating mechanisms based on electromagnetic waves. Sounds (i.e., pressure waves) are most suitable for communication between devices in water.

U.S. Patent Application Publication Nos. 2013/0322206, 2013/0329519 and 2014/0056100 disclose that the currents may be used to move AUVs carrying receivers. Thus, no control is exerted on the AUVs' actual location. In U.S. Pat. Nos. 5,894,450 and 8,509,030, AUVs use one or more underwater references to adjust their positions. Similarly to the OBS approach, placing and maintaining references create new problems and yield added costs. One of the problems is repositioning the references from one data acquisition site to another. Another problem arises, when an AUV drifts too far from the reference(s) so it no longer receives location signals, therefore becoming unable to adjust its position.

Accordingly, it would be desirable to provide methods and AUVs able to maintain a planned arrangement during data acquisition in an inexpensive and reliable manner, overcoming the above-identified problems and drawbacks.

SUMMARY

Some of the disclosed embodiments maintain a planned AUV arrangement in the water by having AUVs independently adjust their positions based on signals received from other AUVs in the arrangement.

According to an embodiment, there is for maintaining a planned arrangement of AUVs deployed in water. The method includes detecting, by an AUV among the AUVs, one or more signals emitted at a predetermined moment by one or more among the AUVs, respectively. The method further includes automatically estimating a current position of the AUV relative to the AUVs emitting signals, based on the detected signals. The method then includes performing a corrective motion to adjust the current position to better match a planned position of the AUV in the planned arrangement. The method is performed in a situation in which any of the AUVs emitting signals has potentially drifted to be away from its planned position in the planned arrangement, at the predetermined moment.

According to another embodiment there is an AUV usable in a planned arrangement of AUVs deployed in water. The AUV has a body hosting a motor able to move the body horizontally. The AUV includes a vector receiver attached to the body and configured to detect one or more signals emitted at a predetermined time by one or more among the deployed AUVs. The AUV also has a controller configured to automatically estimate a current position of the body relative to the planned arrangement, based on the detected one or more signals, and to control the motor to perform a corrective motion to adjust the current position to better match a planned position of the AUV in the planned arrangement. Any of the AUVs emitting signals has potentially drifted to be away from its planned position in the planned arrangement, at the predetermined moment.

According to yet another embodiments there is a controller configured to control a motor of an AUV usable in a planned arrangement of AUVs. The controller has an interface configured to receive data related to one or more signals emitted at a predetermined time by one or more among the deployed AUVs, the one or more signals being detected by a vector receiver attached to the AUV, and to transmit commands to a motor able to move the AUV horizontally. The controller also has a data processing unit configured to automatically estimate a current position of the AUV relative to the one or more AUVs, based on the data, and to generate the commands directing the motor to perform a corrective motion to adjust the current position to better match a planned position of the AUV in the planned arrangement. Any of the AUVs emitting signals has potentially drifted to be away from its planned position in the planned arrangement, at the predetermined moment.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed relative to a marine seismic data acquisition system using AUVs in a planned arrangement. However, similar embodiments and methods may be used for other marine activities using AUVs.

Reference throughout the specification to "one embodiment" or "an embodiment" means that a particular feature, structure or characteristic described in connection with an embodiment is included in at least one embodiment of the subject matter disclosed. Thus, the appearance of the phrases in "one embodiment" or "in an embodiment" in various places throughout the specification is not necessarily referring to the same embodiment. Further, the particular features, structures or characteristics may be combined in any suitable manner in one or more embodiments.

The following embodiments are configured to maintain a planned arrangement of AUVs deployed in water without using fixed reference(s). An AUV among the deployed AUVs detects signal(s) emitted by other(s) deployed AUVs at a predetermined moment. Based on these detected signal(s), the AUV automatically estimates its current position relative to the signal-emitting AUV(s). The signal-emitting AUV(s) are not fixed references because one or more may have drifted from respective planned position(s) in the planned arrangement. The first AUV then performs a corrective motion to adjust its current position to better match the signal-emitting AUVs' planned position in the planned arrangement. When such corrections are performed multiple AUVs (or even all the AUVs in the arrangement) based on signals emitted at plural moments, the planned arrangement is maintained.

The AUVs have propulsion systems enabling independent motion and are configured to record survey data. At times, the AUVs may return to a vessel or an underwater base to recharge their batteries and/or transfer the survey data. The AUV arrangement may be substantially stationary (except for drift) or may follow the same pattern of motion (e.g., all AUVs moving with a constant speed along a line). Note that the aim is to maintain the AUVs' relative positions and, thus, the planned arrangement, but it is not to preserve each AUV's absolute position.

Figure 1:
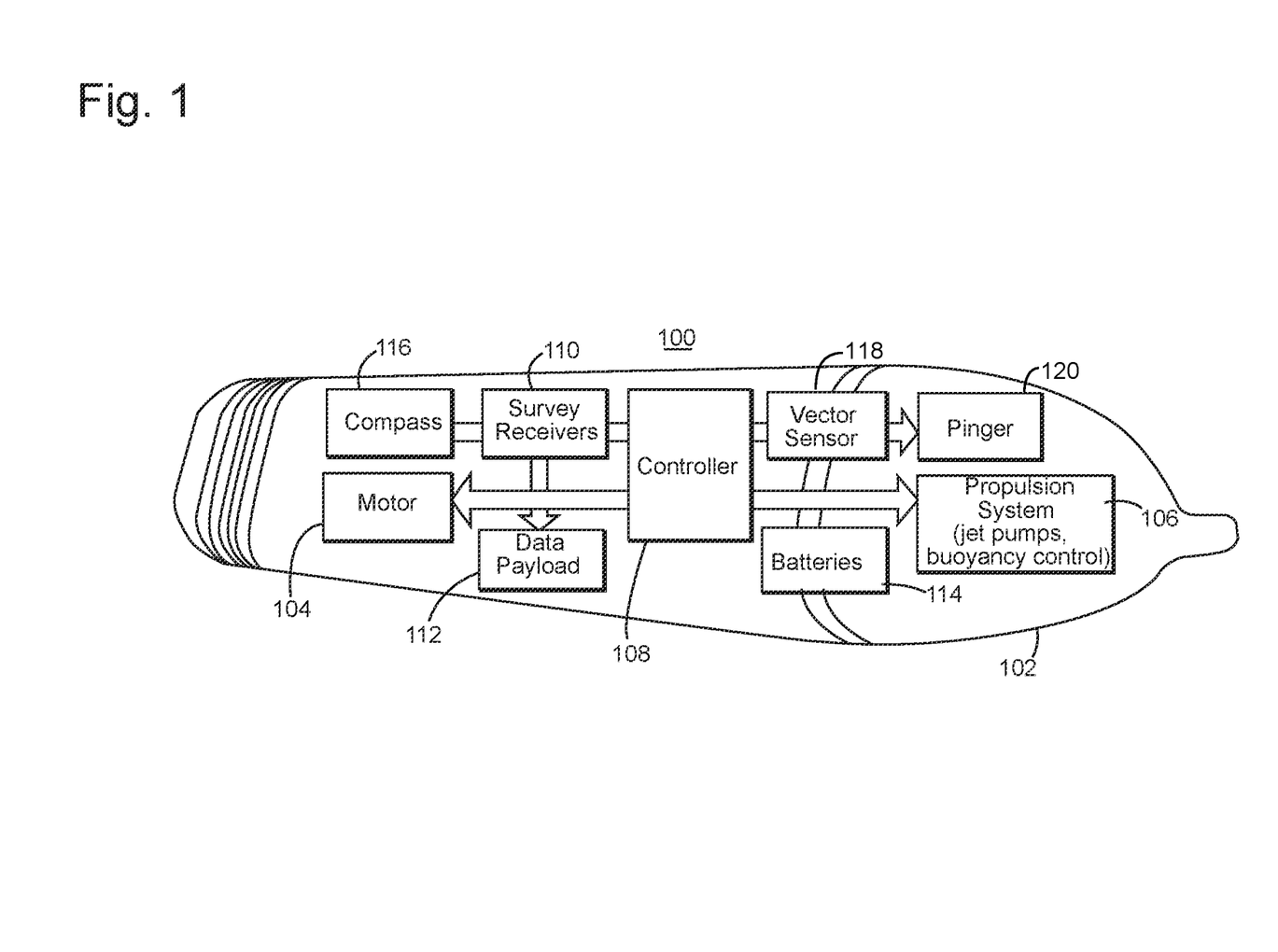
FIG. 1 is a schematic diagram of an AUV according to an embodiment.

FIG. 1 illustrates an AUV 100 having a body 102 to which one or more propellers (not shown) are attached. A motor 104 inside the body activates propeller(s) to move the AUV horizontally. AUV's body 102 may house other propulsion systems 106, such as jets, thrusters, pumps, etc., configured to achieve and maintain a planned depth. Propulsion systems 106 incorporate or are connected to a depth sensor (not shown). Motor 104 and propulsion systems 106 may be controlled by a controller 108.

A survey data acquisition system hosted by AUV 100 includes survey receivers 110 and a survey memory unit 112 configured to store the acquired survey data. Survey receivers 110 may be mounted outside the AUV's body and positioned to favor receiving waves emerging from the explored formation under the seafloor. For a seismic survey, seismic receivers may include hydrophones, geophones, accelerometers, etc. If a four-component seismic survey is performed, survey receivers may include three accelerometers and a hydrophone (i.e., a total of four sensors), or three geophones and a hydrophone. Other sensor types and combinations may be used. Batteries 114 may be used to supply power to various AUV components (e.g., receivers, controller, pinger, etc.). The survey receivers form a vector receiver able to evaluate angles signal incoming angles.

The AUV also includes a compass 116 connected to controller 108 and configured to provide a reference direction (e.g., North). Controller 108 is also connected to a receiver 118 (e.g., a vector sensor) mounted outside the body so as to favor detection of pinger signals emitted by other AUVs in the arrangement. Receiver 118 (which may include an array of transponders) provides, for each signal, information regarding time of arrival, signature and an angle relative to a reference direction from which the signal has arrived. The signature may be an individual frequency, a distinct train of different frequencies, or may be encoded.

Optionally, the AUV may also include a pinger 120 (i.e., a device able to emit a pinging sound at a predetermined moment) triggered by commands from controller 108. Depending on distances between AUVs in the planned arrangement, not all the AUVs must have a pinger to emit signals. However, an AUV that does not have a pinger is not part of the active formation, being able to position itself relative to pinger-carrying AUVs, but not allowing the other AUVs to position themselves taking into consideration this AUVs position. The AUV that does not have a pinger is then "passive."

Figure 2:
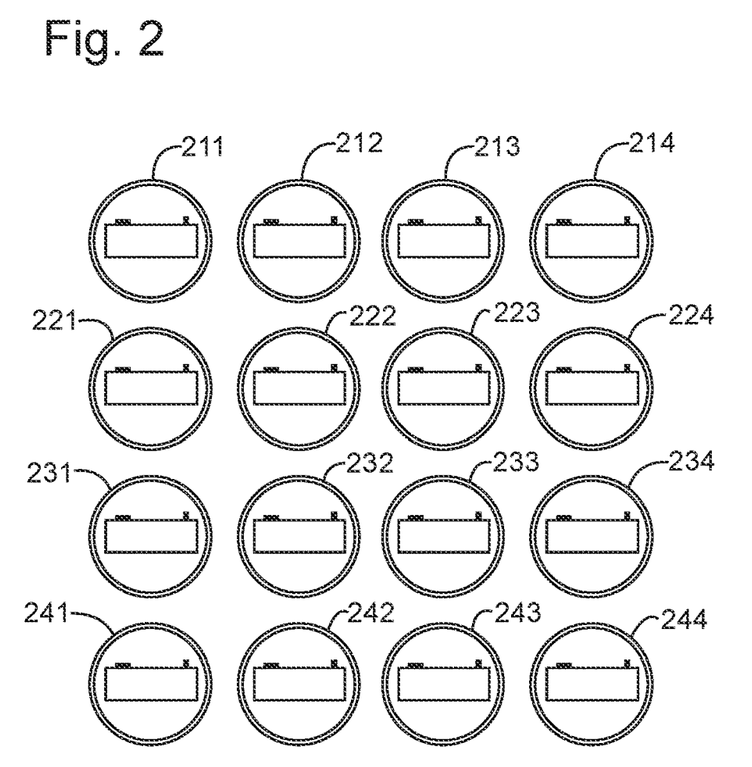
FIG. 2 illustrates a planned arrangement of deployed AUVs according to an embodiment.
Figure 3:
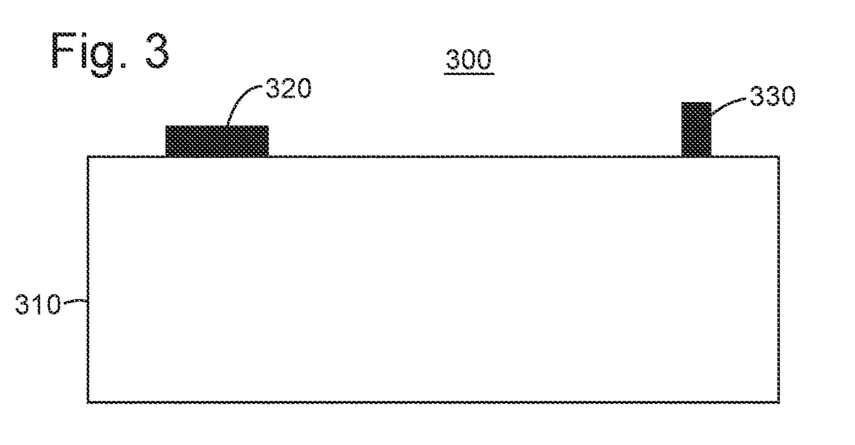
FIG. 3 is a schematic representation of an AUV.

FIG. 2 illustrates a planned arrangement of AUVs. The number of AUVs and any other characteristics of this arrangement are merely exemplary and should not be considered limiting. The AUVs are substantially at the same depth, i.e., in a horizontal plane. However, in another embodiment, the AUVs may have multiple different depths, the receivers being configured to locate three-dimensionally each detected signal's direction of arrival. In this simple arrangement, the AUVs have references 2xy, where x is the row and y is the column on which an AUV should be located. The AUVs in FIG. 2 are schematically illustrated as detailed in FIG. 3, where AUV 300 has a body 310, a receiver 320 and a pinger 330. Distance between AUVs (which have an operative zone of 2-3 m (suggested by the surrounding circles in FIG. 2) may be tens or hundreds of meters (e.g., 300 m). The frequency and power of the signals emitted by the pingers depend on distances between the AUVs, with the frequency being in a range of 100 Hz-500 KHz.

In one embodiment, all the AUVs emit signals at predetermined moments. In another embodiment, for the same arrangement, only some of the AUVs emit signals but the signals are emitted more frequently and/or with more power than when all the AUVs emit signals.

The AUV controllers include synchronized timers, allowing calculation of travel times of signals from their respective sources (i.e., pingers on AUVs) to the AUVs detecting the signals. The receivers are configured to detect directions of arriving signals, and to calculate angles between these directions and a reference direction (which may be indicated by a compass), respectively. In the previously-mentioned three-dimensional AUV arrangement (with the AUVs at different depths), another reference direction may be gravity; thus, the incoming signal's direction would be characterized by an azimuth angle defined and calculated as in the two-dimensional case, and an elevation angle defined and calculated relative to gravity's direction. Calculated angles are then compared with angles according to the planed arrangement.

Figure 4:
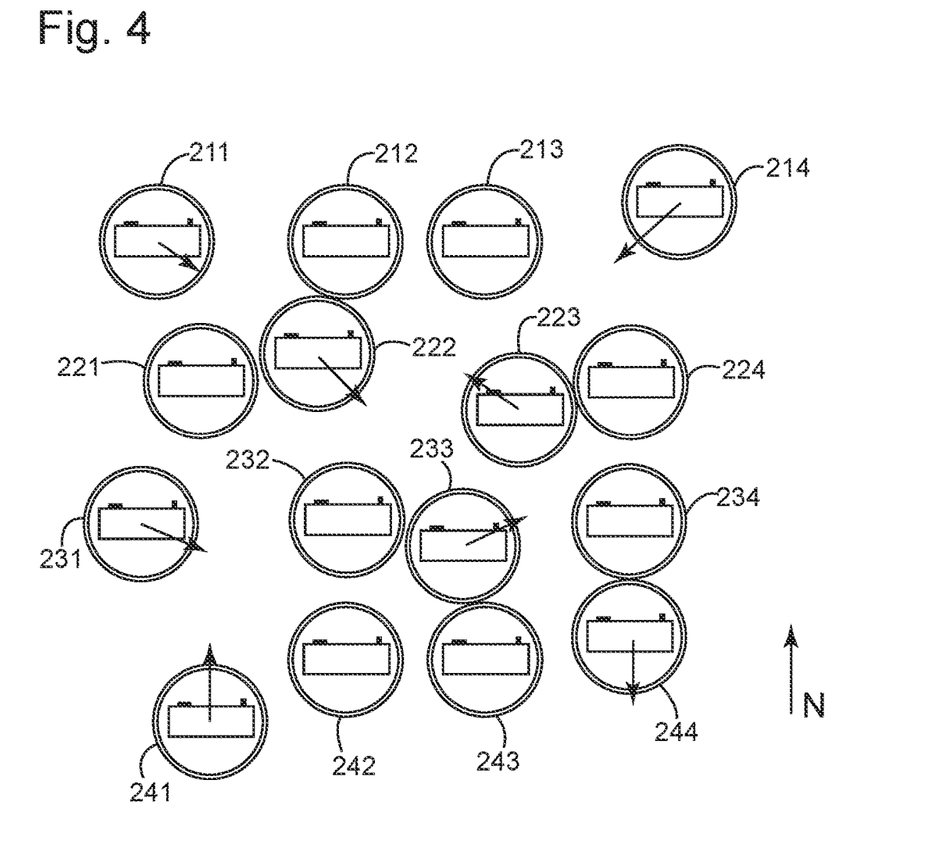
FIG. 4 illustrates an actual arrangement of AUVs at a moment when signals are emitted.

At a moment when the pingers emit signals, the AUVs in the arrangement may have drifted from planned positions as illustrated in FIG. 4. AUVs 211, 214, 222, 223, 231, 233, 241 and 244 in FIG. 4 have drifted from their respective planned positions and need to perform corrective motions, as indicated by the arrows, to return to their planned positions. Meanwhile, AUVs 212, 213, 221, 224, 232, 234, 242 and 243 maintained their respective planned positions in the arrangement.

The number of signals received at an AUV depends on the AUV's position within the arrangement and the power of emitted signals. However, one would expect that AUVs in the middle of the arrangement such as 232 and 233 receive more signals than AUVs on the edges, and especially more than the ones in the corners. By design, emitted signals' power may be such that each AUV (including the more distant ones) receive signals from plural other AUVs in the arrangement. Thus, assuming, for example, that AUV 241 receives signals only from AUV 242, it will still be able to determine and correct its position. Otherwise, AUV 241 may move toward a previously estimated center of the arrangement, to receive signal(s) at a next emission moment.

Figure 5:
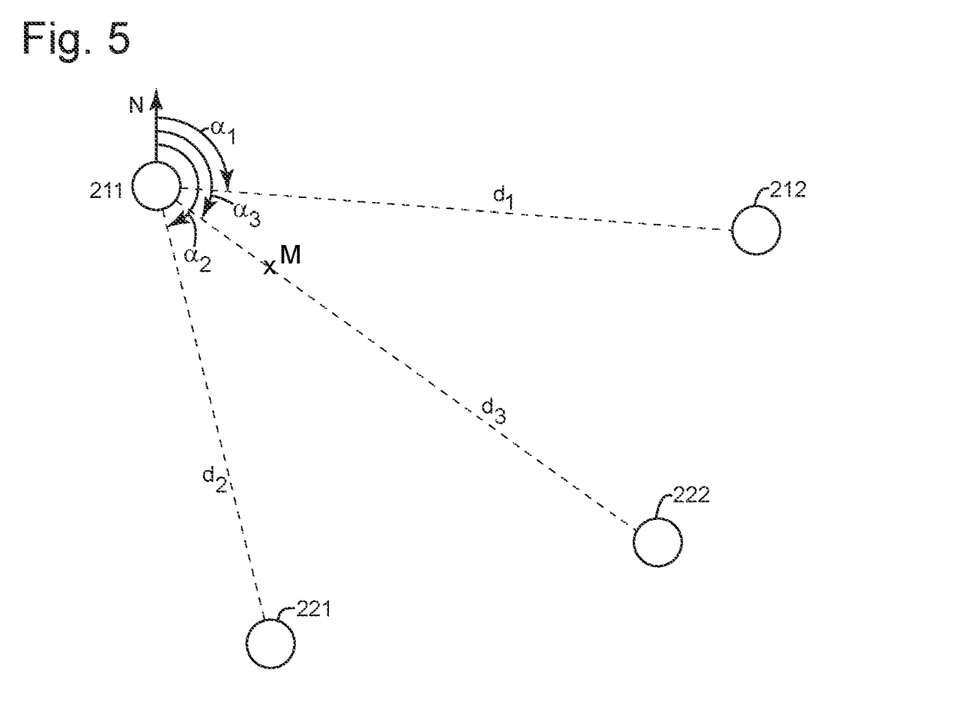
FIG. 5 illustrates signals received by an AUV according to an embodiment.

Upon receiving signals, an AUV's controller automatically estimates the AUV's current position relative to one or more AUVs whose emitted signal(s) has/have been detected. FIG. 5 illustrates AUV 211 receiving signals from AUVs 221, 212 and 222. The controller may then calculate distances $d_1$, $d_2$ and $d_3$ between AUV 211 and AUVs 221, 212 and 222. Using the calculated distances $d_1$, $d_2$ and $d_3$ and detected angles $\alpha_1$, $\alpha_2$ and $\alpha_3$ of the signals arriving from AUVs 221, 212 and 222 with reference direction N, respectively, a current position of AUV 211 relative to AUVs 221, 212 and 222 is then determined. Note that each AUV that emitted a signal received by AUV 211 is identified based on the signal's signature which is uniquely associated with the AUV that emitted the signal.

Figure 6:
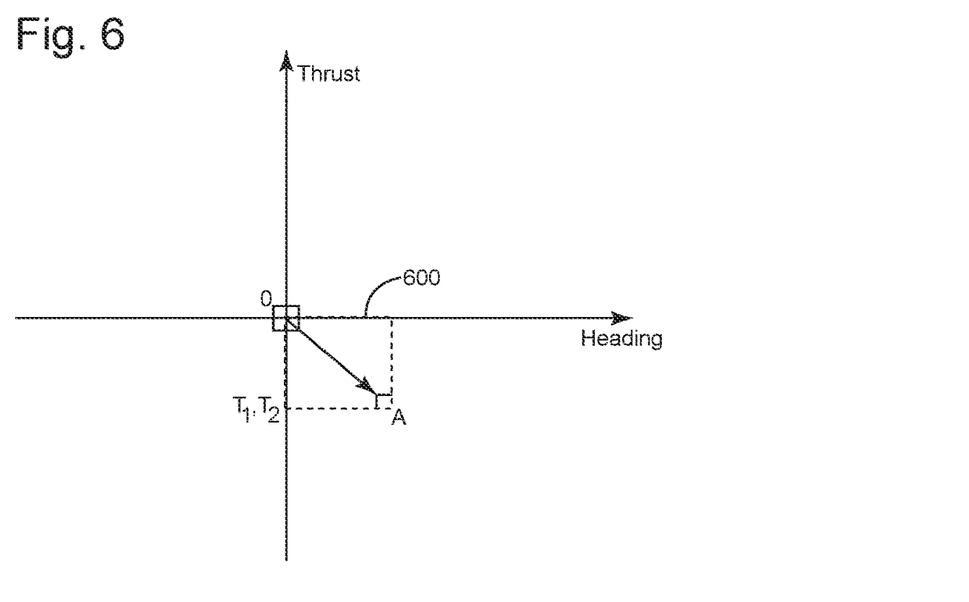
FIG. 6 is a thrust versus heading graph according to an embodiment.

The AUV's controller then estimates corrective motions in a thrust versus heading space as illustrated in FIG. 6. According to one embodiment, based on the signal received from AUV 212, AUV 211 should move at $d_1^0 < d_1$ closer to AUV 212 ($d_1^0$ being the distance between AUVs 211 and 212 in the planned arrangement). Further, since the detected angle $\alpha_1 > \alpha_1^0$ ($\alpha_1^0$ being the angle between reference direction N and a signal arriving from AUV 212 according to the planned arrangement), AUV 211 has to move at least partially opposite to reference direction N. A thrust $T_1$ and a heading $S_1$ of a first corrective motion corresponding to point A in FIG. 6 may be determined by combining this distance and angle information. If measurement and maneuverability limitations are taken into consideration, the first corrective motion's representation in FIG. 6 is a small box around point A. If AUV 211 would receive no other signal, the first corrective motion would then be performed to adjust the AUV's current position to point M in FIG. 5, thus better matching the AUV's planned position in the arrangement.

In a similar manner, based on the signal received from AUV 221, AUV 211 should move at $d_2^0 < d_2$ closer to AUV 221 ($d_2^0$ being the distance between AUVs 211 and 221 in the planned arrangement). Further, since the detected angle $\alpha_2 < \alpha_2^0$ ($\alpha_2^0$ being the angle between reference direction N and a signal arriving from AUV 221 according to the planned arrangement), AUV 211 has to move at least partially toward right (E) relative to reference direction N. A thrust $T_2$ and a heading $S_2$ of a second corrective motion, illustrated also as a box around point A in FIG. 6, may be determined by combining this other distance and angle information. The second corrective motion would then be performed to adjust the AUV's current position to point M in FIG. 5 and better match the AUV's planned position in the arrangement. Since as illustrated in FIG. 4, AUVs 212 and 221 have maintained their planned positions in the arrangement, the first and second corrective motions determined based on signals these AUVs emitted lead to the same final position of AUV 211 (i.e., point M in FIG. 5).

Considering now the signal received from AUV 222, AUV 211 is at the right distance $d_3^0 = d_3$ relative to AUV 222 ($d_3^0$ being the distance between AUVs 211 and 222 in the arrangement). Further, the detected angle $\alpha_3 = \alpha_3^0$ ($\alpha_3^0$ being the angle between reference direction N and a signal arriving from AUV 222 according to the planned arrangement). Thus, it appears that AUV 211 does not have to move (i.e., thrust $T_3=0$ and a heading $S_3=0$ of a third corrective motion corresponding to a box around the graph origin in FIG. 6). Since any of the AUVs has potentially drifted from their planned position in the planned arrangement, at the predetermined moment, from the AUVs' perspective it seems equally possible that AUVs 212 and 221 are in the right positions, or that AUVs 211 and 222 are in the right positions. Therefore, the corrective motion AUV 211 actually performs has to be determined based on a predetermined rule.

In one embodiment, the corrective motion corresponds to the middle of box 600, the box covering all the corrective motions in the thrust versus heading graph. In another embodiment, the corrective motion is characterized by a thrust, which is an average of thrust values of all the corrective motions, and a heading, which is an average of heading values of all the corrective motions. In yet another embodiment, the averages of the thrust and the heading values may be calculated after eliminating outliers in the thrust versus heading graph. In yet another embodiment, the corrective motion is characterized by a thrust, which is a weighted average of thrust values of all the corrective motions, and a heading, which is a weighted average of heading values of all the corrective motions. The weights may depend on distances from the AUV to the AUVs from which signals are received, according to the planned arrangement. Alternatively, the weights may depend on differences between measured distances and distances according to the planned arrangement, respectively. These manners of determining the thrust and heading of the corrective motion actually performed are merely exemplary and not intended to be limiting.

Figure 7:
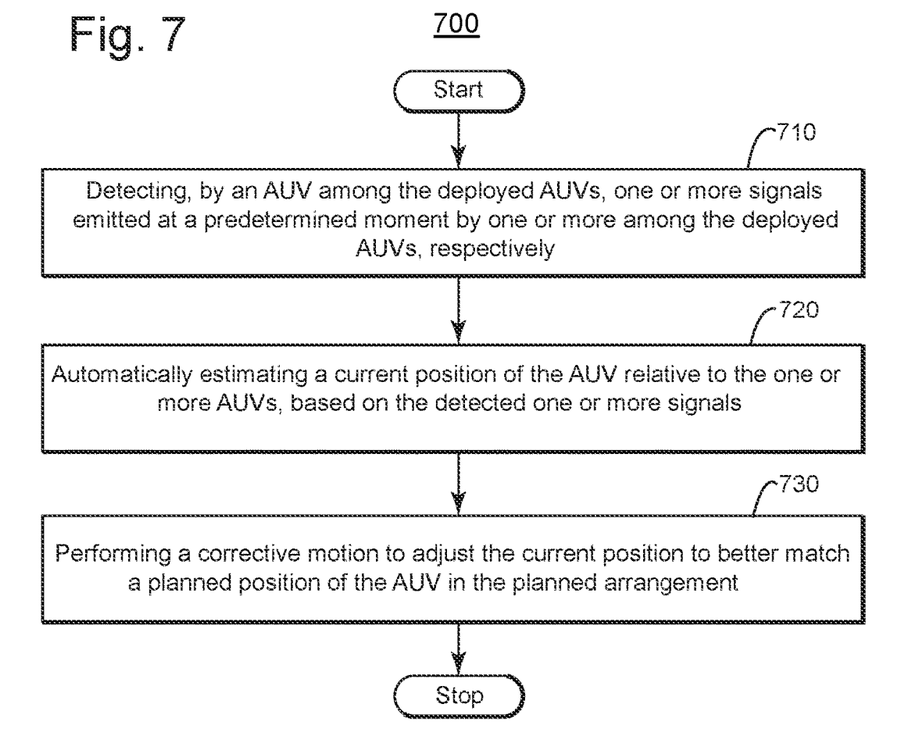
FIG. 7 is a flowchart of a method according to an embodiment.

FIG. 7 is a flowchart of a method 700 for maintaining a planned arrangement of autonomous underwater vehicles (AUVs) deployed in water. Method 700 includes detecting, by an AUV among the deployed AUVs, one or more signals emitted at a predetermined moment by one or more of the deployed AUVs, respectively, at 710. Due to drift, any of the deployed AUVs emitting signals may potentially be away from its planned position in the planned arrangement, at the predetermined moment.

Method 700 further includes automatically estimating a current position of the AUV relative to the one or more AUVs, based on the detected one or more signals, at 720. Method 700 finally includes performing a corrective motion to adjust the AUV's current position to better match its planned position in the planned arrangement, at 730.

Corrective motion may be defined by a heading and thrust necessary to move the AUV toward its planned position. However, this manner of defining corrective motion is not intended to be limiting. For example, corrective motion may be defined by a target final position of the AUV relative to its current position.

As previously mentioned, the signals may have individual signatures, enabling the AUV to determine the identity of each of the one or more AUVs emitting one of the one or more signals, a time of arrival corresponding to each of the one or more signals, and an angle relative to a reference direction from which each of the one or more signals has arrived.

Estimating the AUV's current position may include:
  calculating each distance between the AUV and the AUV(s) emitting the detected signal(s), based on the time of arrival, respectively;
  determining a position of each of the one or more AUVs relative to the AUV using respectively one of the distances and the angle; and
  generating a box in a thrust versus heading space, with the box covering representations of corrective actions relative to each of the one or more AUVs.

The corrective motion performed by the AUV is selected inside the box according to a predetermined rule (as previously discussed and illustrated in FIGS. 5 and 6).

Method 700 may further include preserving an orientation of the AUV relative to the reference direction. Preserving orientation may be performed based on the reference direction (e.g., indicated by a compass) independent from receiving signal(s) from other AUVs in the arrangement.

Method 700 may further include maintaining a predetermined depth by each of the deployed AUVs so that the arrangement is always substantially horizontal (as it is the planned arrangement).

Multiple (or even all AUVs) may detect signals emitted by other AUVs to automatically estimate a respective current position and to perform a respective corrective motion to adjust each respective current position to better match a planned position in the planned arrangement.

The AUV(s) may emit signals simultaneously at plural predetermined moments, thereby triggering multiple AUVs to correct their current positions. The plural predetermined moments may occur at a predetermined time interval. The predetermined time interval may depend on distances between the AUVs and/or distances between AUVs emitting signals. The predetermined time interval may also be adjusted depending on an observed drifting speed. For example, the predetermined time interval may be about 5 s.

Figure 8:
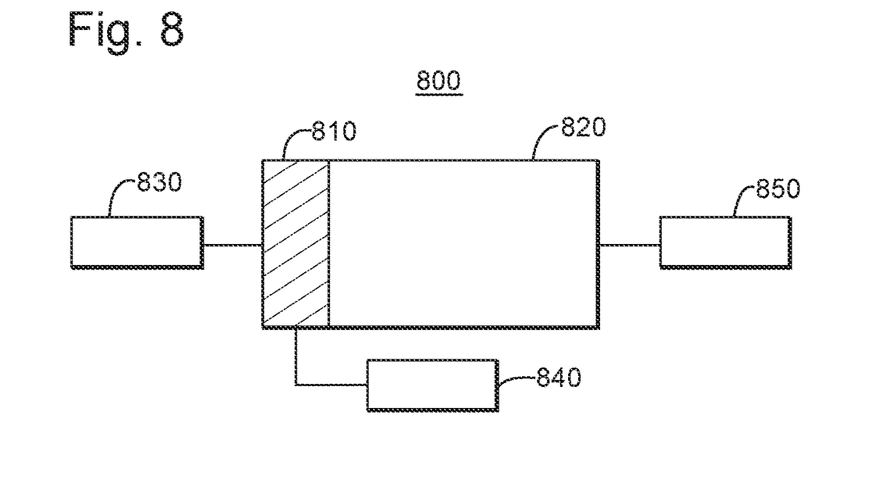
FIG. 8 is a schematic diagram of an AUV controller according to an embodiment.

FIG. 8 illustrates an AUV controller 800 configured to control a motor of an autonomous underwater vehicle (AUV) usable in a planned arrangement of AUVs, according to an embodiment. Controller 800 includes an interface 810 and a data processing unit 820. Interface 810 is configured to receive data related to signals emitted at a predetermined time by deployed AUV(s) in the arrangement, with the signal(s) being detected by receivers 830 (e.g., a vector receiver) attached to the AUV. Interface 810 is also configured to transmit commands to a motor 840 able to move the AUV horizontally. The commands specify a corrective motion.

Data processing unit 820 is connected to the interface 810 and includes at least one processor. Data processing unit 820 is configured to automatically estimate an AUV's current position relative to the AUV(s), based on the data, and to generate commands directing the motor to perform a corrective motion to adjust the AUV's current position to better match its planned position in the planned arrangement. The controller operates under the premise that any of the deployed AUVs emitting the one or more signals has potentially drifted from a respective planned position in the planned arrangement, at the predetermined time.

Data processing unit 820 may automatically estimate the current position of the AUV by:
  calculating distances between the AUV and the AUVs emitting the detected signals, based on the time of arrival, respectively;
  determining positions of the AUVs relative to the AUV, using the distances and detected angles, respectively;
  calculating corrective motions based on the positions, respectively;
  generating a box in a thrust versus heading space, with the box covering representations of the possible corrective motions; and
  selecting the corrective motion inside the box according to a predetermined rule.

Interface 810 may further be configured (A) to receive depth measurements from a depth measuring device, (B) to transmit the depth measurements to the data processing unit, (C) to receive depth-adjusting commands received from the data processing unit, and (D) to transmit the depth-adjusting commands to a depth-adjusting mechanism of the AUV. In this case, data processing unit 820 is also configured to generate depth-adjusting commands based on depth measurements.

In one embodiment, interface 810 may further be configured to transmit a sound-emitting command to a pinger 850 attached to the AUV, triggering the pinger to emit a signal at the predetermined time.

Interface 820 may also include a display configured to illustrate an estimated arrangement of the AUVs from which signal(s) were received and the selected corrective motion. Data processing unit 820 may also estimate a central part of the arrangement such that if the AUV is an edge AUV in the planned arrangement and does not receive any signal, it causes a corrective motion toward the previously estimated central part of the arrangement, which likely places the AUV closer to other AUV(s) to receive signal(s) at a next predetermined moment.

Although controller 800 is able to perform functions related to maintaining the planned arrangement, this functionality may be distributed in plural devices. For example, looking back to FIG. 1, receivers 110 may not only detect but also process information related to the detected signals up to outputting the corrective motion to motor 104. Alternatively, receivers 110 may provide (for each detected signal, to motor 104) group(s) of information including: a distance to a signal-emitting AUV, an angle of the signal receiver from the signal-emitting AUV, and identity of the signal-emitting AUV. The motor may than determine and perform the corrective motion.

The disclosed exemplary embodiments provide methods and devices that maintain a planned arrangement of autonomous underwater vehicles (AUVs) without using a fixed reference. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for maintaining a planned arrangement of autonomous underwater vehicles, AUVs, deployed in water, the method comprising:
   detecting, by an autonomous underwater vehicle, AUV, among the AUVs, one or more signals emitted at a predetermined moment by one or more among the AUVs, respectively;
   automatically estimating a current position of the AUV relative to the one or more AUVs, based on the detected one or more signals by
   calculating each of one or more distances between the AUV and the one or more AUVs emitting the one or more signals, based on times of arrival of the one or more signals,
   measuring one or more angles to a reference direction from which the one or more signals have arrived, respectively,
   determining positions of each of the one or more AUVs relative to the AUV, using corresponding ones among the distances and among the angles,
   calculating possible corrective motions of the AUV to adjust the current position to better match the planned position thereof in the planned arrangement, based on the positions,
   generating a box in a thrust versus heading space, the box covering representations of the possible corrective motions, and
   selecting a corrective motion inside the box according to a predetermined rule; and
   performing the corrective motion,
   wherein any of the one or more AUVs emitting has potentially drifted to be away from a respective planned position in the planned arrangement, at the predetermined moment.

2. The method of claim 1, wherein the corrective motion is defined by a heading and a thrust necessary to move the AUV toward the planned position.

3. The method of claim 1, wherein the one or more signals have individual signatures enabling the AUV to associate an AUV identity with each signal among the one or more signals.

4. The method of claim 1, further comprising:
   preserving an orientation of the AUV relative to a reference direction.

5. The method of claim 1, wherein the planned formation arrangement is substantially horizontal, and the method further comprises:
   maintaining a predetermined depth by the deployed AUVs.

6. The method of claim 1, wherein
   multiple among the AUVs are configured to detect the one or more signals, each of the multiple among the AUVs then automatically estimating a current position thereof and performing a respective corrective motion to adjust the current position thereof to better match a planned position thereof in the planned arrangement.

7. The method of claim 6, wherein the one or more among the deployed AUVs emit signals simultaneously at plural predetermined moments, the detecting of the one or more signals triggering the multiple among the AUVs to estimate the current position thereof relative to the one or more among the AUVs, and to perform the corrective motion.

8. The method of claim 7, wherein the plural predetermined moments occur at a predetermined time interval.

9. An autonomous underwater vehicle, AUV, usable in a planned arrangement of autonomous underwater vehicles, AUVs, deployed in water, the AUV comprising:
   a body hosting a motor able to move the body horizontally;
   a vector receiver attached to the body and configured to detect one or more signals emitted at a predetermined time by one or more among the deployed AUVs, and to measure angles of the detected signals with a reference direction, respectively; and
   a controller configured to automatically estimate a current position of the body relative to the planned arrangement, based on the detected one or more signals, and to control the motor to perform a corrective motion to adjust the current position to better match a planned position of the AUV in the planned arrangement, wherein any of the one or more among the deployed AUVs emitting the signals has potentially drifted away from a respective planned position in the planned arrangement, at the predetermined time, and wherein, to estimate the current position, the controller is configured:

to calculate distances between the AUV and each of the one or more AUVs emitting the one or more signals, using a time of arrival of the one or more signals, to determine positions of each of the one or more AUVs relative to the AUV, using corresponding one of the distances and the angles, to calculate possible corrective motions based on the positions, respectively, to generate a box in a thrust versus heading space, the box covering representations of the possible corrective motions, and to select the corrective motion inside the box according to a predetermined rule.

10. The AUV of claim 9, wherein the controller determines and sends to the motor, a heading and a thrust characterizing the corrective motion.

11. The AUV of claim 9, wherein the one or more signals have individual signatures enabling the controller to associate an AUV identity with each signal among the one or more signals.

12. The AUV of claim 9, further comprising at least one of:
a compass which allow tracking the reference direction; and
a timer synchronized with timers on the one or more AUVs emitting signals to measure traveling times of the one or more signals from the one or more AUVs to the AUV.

13. The AUV of claim 9, the AUV further comprising:
a depth maintaining mechanism configured to maintain a predetermined depth of the AUV.

14. The AUV of claim 9, the AUV further comprising:
a pinger configured to emit a signal at the predetermined time.

15. A controller configured to control a motor of an autonomous underwater vehicle, AUV, usable in a planned arrangement of autonomous underwater vehicles, AUVs, the controller comprising:
an interface configured
to receive data related to one or more signals emitted at a predetermined time by one or more among the deployed AUVs, the one or more signals being detected by a vector receiver attached to the AUV that measures angles of the detected signals with a reference direction, respectively, and
to transmit commands to a motor able to move the AUV horizontally; and
a data processing unit configured
to automatically estimate a current position of the AUV relative to the one or more AUVs, based on the data, and
to generate the commands directing the motor to perform a corrective motion to adjust the current position to better match a planned position of the AUV in the planned arrangement,
wherein any of the one or more among the deployed AUVs emitting the one or more signals, has potentially drifted away from a respective planned position in the planned arrangement, at the predetermined time, and
wherein to automatically estimate the current position of the AUV relative to the one or more AUVs, the data processing unit is configured:
to calculate distances between the AUV and each of the one or more AUVs emitting the one or more signals, using a respective time of arrival of a signal among the one or more signals emitted by each of the one or more AUVs,
to determine positions of each of the one or more AUVs relative to the AUV, using corresponding one of the distances and a respective signal reception angle,
to calculate possible corrective motions based on the positions, respectively,
to generate a box in a thrust versus heading space, the box covering representations of the possible corrective motions, and
to select the corrective motion inside the box according to a predetermined rule.

16. The controller of claim 15, wherein
the interface is further configured
to receive depth measurements from a depth measuring device,
to transmit the depth measurements to the data processing unit,
to receive depth adjusting commands received from the data processing unit, and
to transmit the depth adjusting commands to a depth adjusting mechanism of the AUV; and
the data processing unit is further configured to generate the depth adjusting commands based on the depth measurements.

17. The controller of claim 15, wherein
the interface is further configured to transmit a sound emitting command to a pinger attached to the AUV, triggering the pinger to emit a signal at the predetermined time.

* * * * *